July 10, 1951
R. S. HANMER
2,559,818
PROCESS FOR PRODUCTION OF ALKYL BENZENES
Filed Dec. 31, 1948
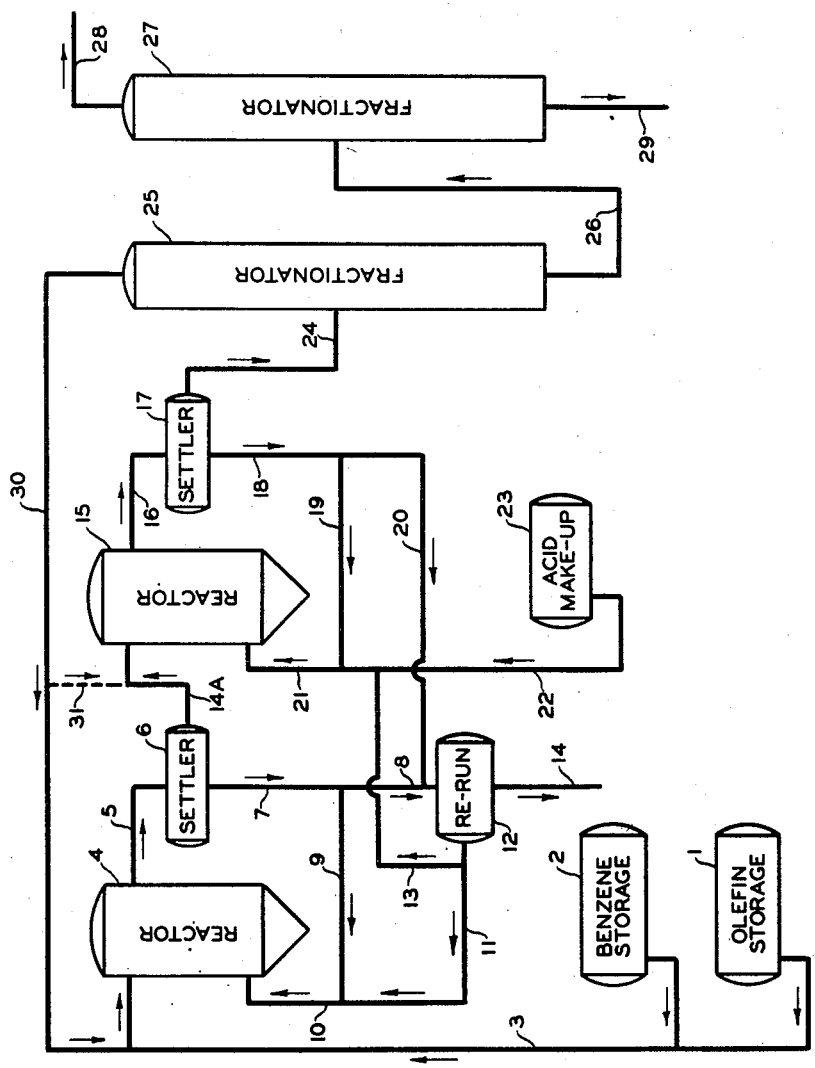
INVENTOR.
R. S. HANMER
BY Hudson and Young
ATTORNEYS Patented July 10, 1951

2,559,818

UNITED STATES PATENT OFFICE 2,559,818

PROCESS FOR PRODUCTION OF ALKYL BENZENES

Robert S. Hanmer, Bartlesville, Okla., assignor to Phillips Petroleum Company, a corporation of Delaware Application December 31, 1948, Serial No. 68,475

8 Claims. (Cl. 260—671)

This invention relates to the production of an alkylated aromatic hydrocarbon. In one aspect the invention relates to the alkylation of an aromatic hydrocarbon with an olefin. In another aspect the invention relates to the catalytic alkylation of an aromatic hydrocarbon with an olefin employing a liquid type catalyst. In one embodiment of the invention there is provided a process suitable for the economic production of an alkylated aromatic for use as a detergent intermediate by the alkylation of an aromatic with a high molecular weight olefin in presence of a liquid type catalyst in a manner and under conditions such that increased yields of high quality alkylate with a minimum of by-product heavy residue are obtained even when the olefin is introduced to the process contained in a feed stock which comprises substantial concentrations of materials capable of forming catalyst soluble oil or substances which have been troublesome heretofore in the alkylation of an aromatic with a high molecular weight olefin.

It is well recognized by those skilled in the art that one of the most troublesome features accompanying the alkylation of aromatic hydrocarbons with high molecular weight olefins in the presence of liquid type catalysts is the formation of catalyst soluble products attendant upon the use of olefin concentrates, for example, cracked petroleum naphthas as alkylating agents. Also, these catalyst soluble products are at least partially soluble in the alkyl benzenes produced, thus contaminating the same and also have a deleterious effect upon the conversion because of side reactions in which olefins, otherwise useful in the process, are converted to high boiling heavy alkylates not useful, for example, as detergent intermediates.

I have now discovered a process for the alkylation of aromatic hydrocarbons with high molecular weight straight or branched chain olefins from olefin concentrates, for example, cracked petroleum naphthas, wherein the removal of objectionable catalyst soluble products is accomplished prior to the main reaction of alkylation, with resulting improvements in the yield of useful alkylate and in the quality of such useful alkylate.

According to the method of my invention, in a first step, the aromatic and olefin hydrocarbon streams are mixed and introduced into a primary reactor wherein they are contacted with a liquid type catalyst, for example, hydrofluoric acid. The reaction conditions and catalyst composition in this primary reaction zone are carefully controlled so that the catalyst soluble materials, present in the hydrocarbon feed, which are most readily soluble in the catalyst may enter the catalyst phase. These catalyst soluble products are thereafter removed from the catalyst phase as catalyst soluble oil. In a separate or second step of the process the hydrocarbon effluent from the primary reaction step is passed into a second reactor and is there contacted with a liquid type catalyst. The reaction conditions and catalyst composition within this secondary reaction zone are controlled to permit essentially complete utilization of the desirable olefins in the olefin concentrate for the alkylation of the aromatic hydrocarbon in the feed stream. The alkylation products may be recovered by any suitable means, for example, gravity separation of the catalyst phase followed by fractionation of the hydrocarbon phase.

By operating in this manner undesirable compounds such as those containing sulfur, diolefinic hydrocarbons, alkenyl aryl compounds, certain polynuclear aromatic hydrocarbons and possibly others of unestablished identity are removed from the alkylation feed prior to the principal alkylation reaction thereby providing optimum conditions for reactions, in the alkylation zone, which lead to the production of useful alkylates. It is an advantage of my process that undesirable catalyst soluble materials or components capable of undergoing reactions which produce catalyst soluble materials are removed prior to the principal alkylation step, thereby enhancing the yield of desirable alkylates, capable of utilization, say as detergent intermediates. In an additional advantage is that the quality of the useful alkylate produced by means of my process is improved due to the absence of contaminating materials boiling in the same range, for example, polyphenyl alkanes which may arise from the reaction of diolefins and/or alkenyl aryl compounds with the aromatic hydrocarbon used in the usual alkylation process.

A further advantage of my process lies in the fact that olefin concentrates which contain large amounts of catalyst soluble oil forming materials may be employed to alkylate aromatic hydrocarbons which feed stocks would be unsuited to the usual alkylation process because of excessive side reactions as mentioned above.

I have further discovered that the process of my invention gives rise to certain advantages not apparent from the above discussion. I have found that the removal of catalyst soluble materials in the primary reaction zone proceeds rapidly when carried out under certain conditions. Furthermore, the principal alkylation reaction carried out in the secondary reaction zone may be performed under conditions of shorter residence time and with lower catalyst volumes, when catalyst soluble materials are not present to dilute the catalyst phase, than in the conventional process. It follows, therefore, that by means of my process the production capacity of a reactor of fixed size conveniently may be increased by more than a proportionate amount by the incorporation of a small primary reactor according to the method herein disclosed.

These and other advantages of the present invention will be apparent from a description of the accompanying diagram in which is shown a flow sheet of one specific embodiment of the process. In the diagram and explanation reference is made to specific catalysts and materials, not in restriction of the disclosure, but in the interest of clarity.

Referring to the drawing, olefin concentrate, such as could be obtained from selected fractions of cracked petroleum naphthas, is led from storage 1 and mixed with benzene from storage 2 in line 3. The feed stream is diluted with additional benzene from line 30 to provide the desired mol ratio of benzene to olefin, say about 8 to 1. The feed stream is intimately mixed in the primary reactor with the catalyst which enters via line 10.

The catalyst employed in the primary reaction zone conveniently may comprise hydrofluoric acid diluted with catalyst soluble oil and/or water so that the concentration of acid is 70 to 80 per cent. The catalyst volume should be 10–15 per cent of the reactor volume and the total feed rates should be such that a residence time of, say about 30 seconds is obtained. Under these conditions the materials present in the hydrocarbon feed stream which are most readily soluble in the catalyst, such as sulfur compounds, diolefinic hydrocarbons, alkenyl-aryl compounds, etc., are dissolved in the catalyst as catalyst soluble oil. A minor conversion of olefins to useful alkylate will usually occur in this reactor, say 5–10 per cent of the total conversion. For this reason a mol ratio of benzene to olefin in the range suitable for alkylation is usually preferred in the primary reaction zone.

The reactor effluent is passed through line 5 into settler 6 where the catalyst separates by gravity. The catalyst phase containing the undesirable catalyst soluble materials is removed via line 7. A portion of this stream may be recycled to the reactor through line 9 and the remainder may be passed to a catalyst re-run unit 12 via line 8. In the catalyst re-run unit hydrofluoric acid is removed by distillation and returned to the reaction zone through line 11. Catalyst soluble oil is removed through line 14.

The hydrocarbon phase from settler 6 is passed through line 14A into the secondary reactor 15 where it is intimately mixed with catalyst entering via line 21. In this reaction zone the catalyst comprises hydrofluoric acid diluted with catalyst soluble oil in minor amount and/or water such that the concentration of acid is preferably 85–95 per cent. The catalyst may comprise 15–25 per cent of the reactor volume and the feed rates of all streams entering the reactor may be such that a residence time of 15–20 minutes is obtained. Under these conditions substantially complete olefin conversion is obtained within the secondary reaction zone.

The effluent from the secondary reactor is passed via line 16 into settler 17 wherein the catalyst separates by gravity and is led off through line 18. The catalyst stream may be split and the major portion recycled through line 19 while the minor portion is conducted through line 20 into the re-run unit 12. Regenerated catalyst is returned to the system via line 13. Make-up hydrofluoric acid may be conveniently added to the system through line 22 from storage 23.

The hydrocarbon phase obtained in settler 17 is passed via line 24 into a fractionator 25 wherein benzene is removed overhead and is recycled to the primary reactor through line 30. The bottoms product comprising deolefinized naphtha and alkylate is passed through line 26 into a second fractionator 27. In this unit the deolefinized naphtha is removed overhead via line 28 and alkylate product is removed as a bottoms product via line 29. The alkylate may be further processed as desired.

Should it be desirable under certain circumstances to operate with a higher mol ratio of benzene to olefin in reactor 15 than in reactor 4, as in instances where the olefin concentrate contains relatively large amounts of short chain alkyl benzenes, a portion of the recycle benzene in line 30 may be diverted to reactor 15 via line 31. By this means the ratio of benzene to olefin would be increased in the alkylation zone providing more favorable conditions under which to react the olefins with benzene in preference to the short chain alkyl benzenes also present. However, it is noted, that at least a portion of the benzene used in the process preferably is fed into reactor 4 to cause its alkylation in preference to that of the constituent aromatics with the olefins in the feed stock. In some cases only the olefin containing fraction may be treated in reactor 4.

The method of my invention is adaptable to the use of catalysts such as boron fluoride compositions with water, hydrofluoric acid, and the like. It may also be effectively employed with hydrogen fluoride, either anhydrous or in aqueous solutions of a concentration of 50 per cent or higher. The catalyst may be the same in each reactor but will vary in composition as disclosed herein. Thus in the primary reactor the catalyst preferably should contain relatively large amounts of catalyst soluble oil and/or water in order to obtain the selective removal of catalyst soluble materials from the hydrocarbon feed, say 10–25 per cent water and/or 5–25 per cent catalyst soluble oil. The catalyst fed to the secondary reactor will generally contain 0–10 per cent water and 2–10 per cent catalyst soluble oil.

Conditions in the two reaction zones will be somewhat dependent upon the catalyst employed. Usually temperatures in the range 40°–140° F., preferably from 80° to 120° F., and pressures sufficiently high to avoid vaporization of the catalyst, say from 15 to 60 pounds per square inch gauge, will provide optimum operation. The mol ratio of aromatic hydrocarbon to olefin will be from 2:1 to 15:1, preferably from 5:1 to 10:1. It is important to the process that the volume ratio of hydrocarbon to catalyst in the primary reactor be high, say 20:1 to 7:1 and it is an advantage of the process that the volume ratio of hydrocarbon to catalyst in the secondary reactor may be as high as 7:1 to 3:1.

The process of my invention is adaptable to the alkylation of benzene, toluene, xylenes and the like, employing high boiling olefins containing at least seven and not more than about 18 carbon atoms to the molecule as the alkylating agent. Olefin concentrates comprising a fraction of a cracked petroleum naphtha boiling between about 200° and about 500° F. furnish a convenient source of such olefins. Said olefin concentrates may comprise 10–50 per cent olefins and often comprise 10–35 per cent aromatics. Sulfur compounds, diolefinic hydrocarbons, alkenyl aryl hydrocarbons, polynuclear aromatic hydrocarbons and the like may often comprise as much as 10–30 per cent of said concentrates when derived from thermally or catalytically cracked petroleum naphthas. In any event the olefins present in the olefin concentrate used are principally of the non-polymeric type.

*Example*

An olefin concentrate was prepared by fractionating a "Cycloversion" (catalytically cracked) naphtha to produce a cut boiling in the range 380° to 450° F. A blend comprising 15.33 pounds of this concentrate, containing 2.60 pounds of olefin, and 10.00 pounds of benzene was fed to a primary reactor where it was admixed with a volume of catalyst equal to 13 per cent of the hydrocarbon. The catalyst comprised 75 per cent hydrogen fluoride, 15 per cent water and 10 per cent catalyst soluble oil. The mixture was agitated for about 30 seconds at a temperature of 70° F. The effluent was then passed through a separator and the hydrocarbon layer fed into a second reactor where it was admixed with a volume of catalyst equal to 33 per cent of the hydrocarbon. This catalyst comprised 97 per cent hydrogen fluoride and 3 per cent water. The mixture was agitated at a temperature of 90° F. for a period of 20 minutes after which the effluent was discharged to a separator to remove the catalyst. The hydrocarbon phase was fractionated to recover alkylate product. Catalyst soluble oil was recovered from the combined catalyst phases. The results are shown after "New Process" in the table below.

A second alkylation was carried out in which an equivalent amount of the same blend as was used above was fed to a reactor where it was admixed with an equal volume of 97 per cent hydrofluoric acid containing about 3 per cent water. The mixture was stirred at a temperature of 90° F. for about 30 minutes after which the effluent was passed through a separator to remove the catalyst. Alkylate product was recovered from the hydrocarbon layer and catalyst soluble oil was recovered from the catalyst layer. The results are shown after "Old Process" in the table below.

|  | Pounds Per Pound of Olefin Charged | | |
| --- | --- | --- | --- |
|  | Catalyst Soluble Oil | Alkylate (550–700° F.) | Alkylate (Above 700° F.) |
| New Process | 0.58 | 0.65 | 0.26 |
| Old Process | 0.54 | 0.52 | 0.43 |

In the two reactions it will be observed that by the new process the catalyst soluble oil produced, or isolated as such, was about 7 per cent greater than by the conventional process. Approximately 80 per cent of this catalyst soluble oil was removed in the first step obviously increasing the concentration of desirable olefins in the feed to the second step by a substantial amount and at the same time providing an improved environment for the alkylation reaction. By so operating the yield of useful alkylate (boiling 550°–700° F.) was 25 per cent higher for the new process and the high boiling residue was reduced by about 40 per cent. It is also noteworthy that the "Old Process" was inferior in spite of the advantage of time given it since longer residence times lead to better yields of detergent alkylate.

Reasonable variation and modification are possible within the scope of the appended claims to the invention, the essence of which is that an improved process for the alkylation of an aromatic hydrocarbon with a high molecular weight olefin in presence of a liquid type catalyst has been provided wherein by a preliminary contact of the feed hydrocarbons with a liquid type catalyst under certain conditions in a first zone catalyst soluble oil or substances, which otherwise would contaminate the desired alkylated aromatic product and also reduce the yield thereof, are removed from the feed hydrocarbons which are then alkylated in a separate or second zone.

I claim:

1. The alkylation of a low boiling aromatic hydrocarbon with a high molecular weight olefin in the presence of a liquid type catalyst which comprises the steps of passing an admixture of said hydrocarbon and a petroleum fraction containing said olefin and materials which upon contact with said catalyst will form oils soluble therein into a primary zone; in said zone contacting said admixture with said catalyst under conditions and for a time sufficient to form and to dissolve said oils therein but insufficient to cause more than a slight alkylation of said hydrocarbon; separating said admixture from said catalyst and passing it to a secondary zone containing a liquid type catalyst and maintained under alkylating conditions to complete the desired alkylation.

2. The alkylation of a low boiling aromatic hydrocarbon with an olefin having 7 to 18 carbon atoms to the molecule in the presence of a liquid type catalyst which comprises the steps of passing an admixture of said hydrocarbon and a petroleum fraction containing said olefin and materials which upon contact with said catalyst will form an oil soluble therein into a primary zone; in said zone contacting said admixture with said catalyst under conditions and for a time sufficient to form and to dissolve said oil therein but insufficient to cause more than a slight alkylation of said hydrocarbon; separating said admixture from said catalyst and passing it to a secondary zone containing a liquid type catalyst and maintained under alkylating conditions to complete the alkylation.

3. The process of claim 2 wherein the catalyst is hydrofluoric acid, the temperature in the said zones is in the range 60°–140° F., the ratio of hydrocarbon to catalyst is in the range 20:1 to 7:1 in the primary zone and in the range of 7:1 to 4:1 in the secondary zone, the residence time in the primary zone is of the order of less than one minute and the residence time in the secondary zone is of the order of ⅓ hour, and the olefin is contained in a petroleum naphtha fraction boiling in the range 200° F.–500° F.

4. The process of claim 3 wherein the aromatic hydrocarbon is benzene.

5. The process of claim 3 wherein the aromatic hydrocarbon is toluene.

6. The process of claim 3 wherein the aromatic hydrocarbon is a xylene.

7. The alkylation of benzene with an olefin in the presence of hydrofluoric acid which comprises the steps of passing an admixture of benzene and a catalytically produced petroleum naphtha boiling in the range 380° F.–450° F. into contact, in a primary zone, with hydrofluoric acid catalyst, containing about 75% hydrogen fluoride, about 15% water and about 10% of catalyst soluble oil, the ratio of hydrocarbon phase to catalyst phase being about 7.5 to 1, for a time of the order of less than one minute, at a temperature of about 70° F.; separating said admixture from said catalyst and passing it to a secondary zone and therein contacting it with a hydrofluoric acid catalyst, containing about 97% hydrogen fluoride and about 3% water, the ratio of hydrocarbon phase to catalyst phase being about 3 to 1 for a time of the order of about ⅓ hour and at a temperature of about 90° F., to cause the alkylation of the benzene to a desired extent.

8. In the alkylation of a low boiling aromatic hydrocarbon with a high molecular weight olefin in the presence of a liquid type catalyst wherein said olefin is contained in a petroleum fraction which also contains materials which upon contact with said catalyst will form soluble oils therein the steps which comprise passing said petroleum fraction into contact with said catalyst under conditions and for a time sufficient to form and to dissolve said oils therein; separating said petroleum fraction from said catalyst and passing it together with an aromatic hydrocarbon to a secondary zone containing a liquid type catalyst and maintained under alkylating conditions to complete the desired alkylation.

ROBERT S. HANMER.

REFERENCES CITED

The following references are of record in the file of this patent:

UNITED STATES PATENTS

| Number | Name | Date |
|---|---|---|
| 1,994,249 | Ipatieff et al. | Mar. 12, 1935 |
| 2,372,320 | Frey | Mar. 27, 1945 |
| 2,373,031 | Kimberlin | Apr. 3, 1945 |
| 2,378,763 | Frey | June 19, 1945 |
| 2,404,340 | Zimmerman | July 16, 1946 |
| 2,423,470 | Simons | July 8, 1947 |
| 2,429,622 | Hirsch | Oct. 28, 1947 |
| 2,429,887 | Magoun | Oct. 28, 1947 |
| 2,437,356 | Hill | Mar. 9, 1948 |
| 2,439,457 | Donleavy et al. | Apr. 13, 1948 |
| 2,439,729 | Guinot | Apr. 13, 1948 |
| 2,456,119 | Friedman et al. | Dec. 14, 1948 |